(No Model.)
A. N. MILLER.
MACHINE FOR CUTTING SOLES.
No. 548,379. Patented Oct. 22, 1895.
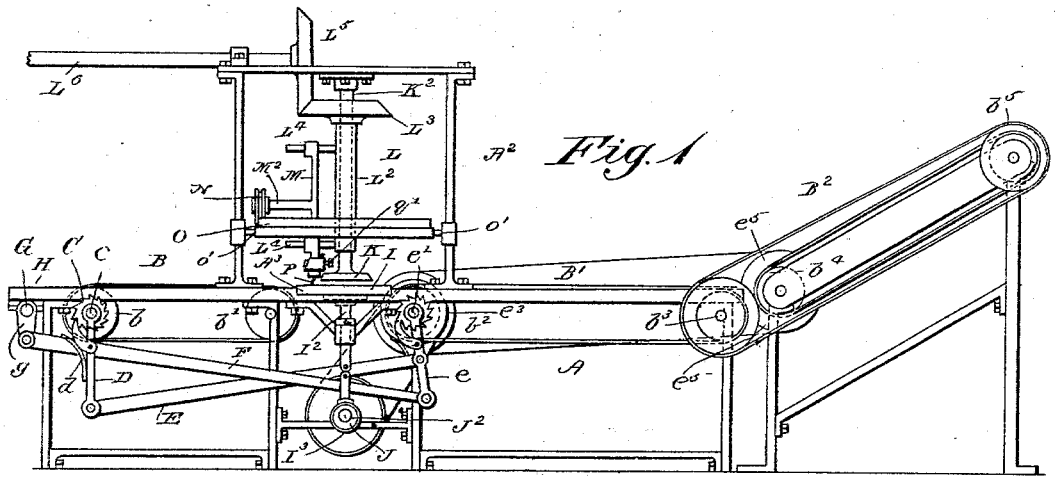
*Fig. 1*
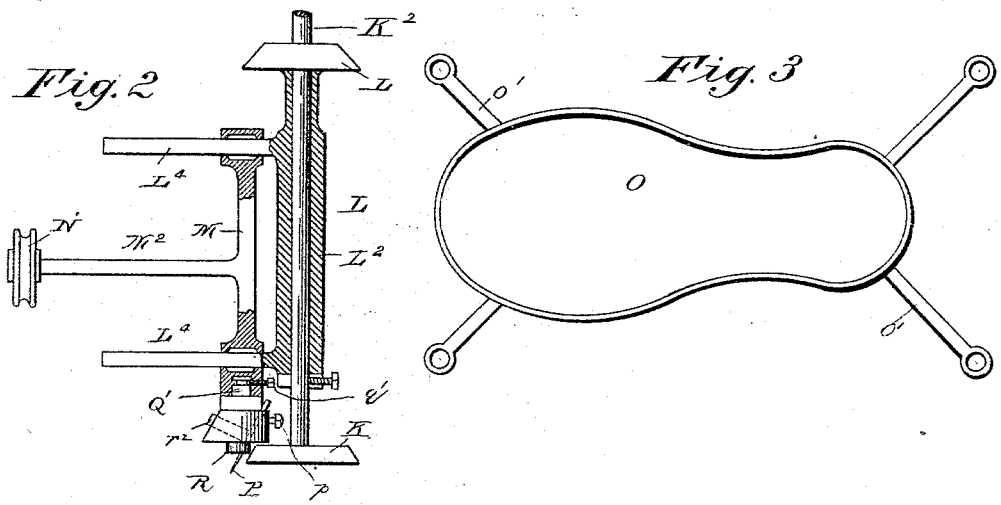
*Fig. 2*  *Fig. 3*
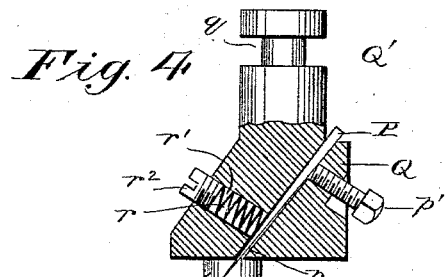
*Fig. 4*
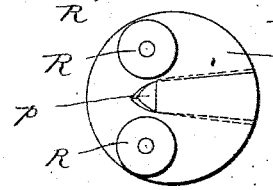
*Fig. 5*
Witnesses:
W. B. Harris
Ackland Lord Boyle
Inventor:
Alfred N. Miller
By Stetson & Bowne
Attorneys.

UNITED STATES PATENT OFFICE.

ALFRED N. MILLER, OF WILLIAMSPORT, PENNSYLVANIA.

MACHINE FOR CUTTING SOLES.

SPECIFICATION forming part of Letters Patent No. 548,379, dated October 22, 1895.

Application filed January 19, 1895. Serial No. 535,437. (No model.)

*To all whom it may concern:*

Be it known that I, ALFRED N. MILLER, a citizen of the United States, residing at Williamsport, Lycoming county, in the State of Pennsylvania, have invented a certain new and useful Improvement in Machines for Cutting Soles, of which the following is a specification.

The object of my invention is to provide a machine wherein the material for the soles will be fed intermittently forward in sheets to cutting instrumentalities by which the shape of the sole to be produced can be readily cut from the sheet of material.

In carrying out the invention I employ a frame provided with intermittently-moving aprons adapted to carry forward the material for the sole, and having a place between two of said aprons wherein is located a vertically-movable presser adapted to press the material against a superposed templet. A rotary head or block driven by suitable means is provided concentric with the support of the templet, upon which head is mounted a sliding frame which carries a knife that is guided by the templet so as to cut the desired shape in the material for the sole. The movements of the knife are regulated by means of a suitably-shaped track and trolley or roller, the latter being connected with the sliding frame, so that as the latter is carried around by the rotating head the knife will be caused to follow the outline of the track to produce the desired-shaped sole.

Other novel details of improvement and combinations of parts will be more fully hereinafter set forth, and then pointed out in the claims.

Reference is to be had to the accompanying drawings, forming a part hereof, wherein—

Figure 1 is a side elevation of my improved machine complete. Fig. 2 is a cross-sectional view of a part thereof. Fig. 3 is a plan view of the track. Fig. 4 is an enlarged section of the knife-block, and Fig. 5 is an inverted plan thereof.

In the accompanying drawings, in which similar letters of reference indicate corresponding parts in the several views, the letter A indicates a frame, which may be of suitable construction and provided with a superposed framing $A^2$, for the purpose hereinafter specified.

$B\ B'\ B^2$ are endless intermittently-movable aprons passing over rollers $b\ b'\ b^2\ b^3\ b^4\ b^5$, a suitable space being left between the rollers $b'$ and $b^2$, as shown. The apron $B'$ passes over the rollers $b^2\ b^3$, and the apron $B^2$ passes over the rollers $b^4\ b^5$, as shown. By preference the apron $B^2$ inclines downwardly and inwardly to enable the heavy rubber stock that is to be used to be readily carried up from the apron $B'$, the cut soles falling through the space between the aprons. This can be accomplished by merely elevating the roller $b^5$, as shown. Intermittent forward motion is given to this apron as follows: To the shaft $c$ of the roller $b$ is connected a ratchet C, and on the shaft $c$ is hung a lever D, having a pawl $d$. From the lever D extends a rod E, which is pivoted to a crank-arm $e$, carried by the shaft $e'$ of the roller $b^2$, the lever $e$ being connected by a rod F to a crank-arm $g$ on the main driving-shaft G, which may be operated by belt and pulley in the well-known manner. The arrangement of the crank-arm $g$ is such that when moving through half the circle in one direction it will cause the shaft $c$ to turn correspondingly through the ratchet-and-pawl mechanism, and when the shaft passes through the other portion of its rotation, the ratchet and pawl will move backward without operating the roller $b$, by which means an intermittent movement is given to the apron B.

Any suitable means may be employed for communicating intermittent motion from the apron $B'$ to the apron $B\ B^2$, and for this purpose I have shown the shaft $e^2$ as provided with a pulley, from which extends a belt to a pulley $e^5$ on the shaft of the roller $b^4$, or, if preferred, a ratchet-and-pawl arrangement corresponding to the devices connected with the rollers $b^2$ and $b^4$ for giving motion to the aprons $B'\ B^3$. By the above arrangement as the shaft G rotates each apron $B\ B'\ B^2$ will be given a corresponding intermittent forward motion whereby to feed intermittently the desired amount of movement of material H—such as rubber or other cloth—from which the soles are to be cut.

In the space between the rollers $b'\ b^2$ the table of the machine is provided with an opening $A^3$, in which the presser I is adapted to be raised and lowered in the working position, being slightly elevated above the surface of the table. At other periods it is allowed to sink a little below, as shown in Fig. 1. From the presser I depends a stem $I^2$, having a strap $I^3$, adapted to embrace a suitable shaft-cam J on a shaft $J^2$, suitably hung in the frame A of the machine. As the cam turns, it will raise the presser I and hold it in the raised position a suitable length of time to confine the material H between it and a templet K to permit the material to be operated upon by a cutting-knife. When the presser is lowered, said material will be free to move forward by the aprons. Above the presser I the templet K is rigidly carried by a smooth cylindrical stem $K^2$, suitably held in the supplemental frame $A^2$, so that the presser can press the material H firmly against said templet. The templet K will preferably be made of a suitable piece of metal of the desired thickness, its outline corresponding to the shape of the sole it is desired to produce from the material H, the upper outer edge of said templet being preferably inclined downwardly and outwardly, as shown. Upon the stem or rod $K^2$ of the templet K is mounted a rotative head L, which is shown carried by a sleeve $L^2$, adapted to rotate on the stem and carrying a suitable pulley $L^3$, by which said head can be turned, as by a friction-pulley $L^5$ on a shaft $L^6$, suitably driven. The head L carries two parallel outwardly-projecting arms $L^4$, which are of sufficient length to sweep over and beyond the longest diameter of the templet K. Upon the arms $L^4$ is suitably mounted to slide longitudinally thereof a frame or body M, having a horizontally-projecting stem $M^2$, which lies parallel with the arms $L^4$. At the outer end of the stem $M^2$ is journaled a suitable grooved roller or trolley-wheel N, which is adapted to travel on a track O, that is carried by the frame $A^2$ above the templet K. The track O has the outline corresponding to the templet K, but of larger dimensions than said templet, to give freedom of movement to all the parts.

The track O is shown supported by arms $o'$, which project inwardly from the frame $A^2$. The frame or body M carries a knife P, which is adapted to rest against and be carried around the templet K, so as to cut the shape of the sole from the material H when the latter is held between said templet and the presser I. The knife P is carried by a block Q, which is shown provided with a pivot $Q'$, suitably journaled in the bearing in the frame M, so that said block can turn on the pivot $Q'$ when passing around the curves of the templet. By preference the pivot $Q'$ has an annular recess $q$ to receive a set-screw $q'$, whereby the pivot $Q'$ is held in its support without danger of dropping out, and yet permitted to turn.

The knife P is held in a slot $p$ in the block Q, and by means of the set-screw $q'$ is adapted to be adjusted therein, the knife having the general shape shown in the drawings or being of any other desired contour. In order to keep the knife properly pressed against the beveled edge of the templet I utilize a spring $r$, which is shown located in the recess $r'$ in the block Q, and held therein by a cap or cover $r^2$, thereby pressing against the knife, whereby automatic adjustment is effected. In order to cause the knife to properly follow the outline of the templet, I provide rollers R, which are pivoted to the block Q, one on each side of the knife P, the knife being located at the pivotal center of the block, so that as the latter turns the knife will not be carried outside of the correct cutting position with relation to the templet and the material being cut.

The operation of my improved machine is as follows: The presser I is first lowered to at least a level with the table $A'$, and the material H for the sole laid upon the aprons $B'$ $B^2$ and the machine started. The moving apron $B'$ then presents the material over the opening in the table $A'$, the presser I then rising and pressing the material H against the templet K, whereupon the aprons come to rest. The rotating head L then causes the knife P to cut the material H, and as the head L turns on the stem $K^2$ the frame M will be carried around, its roller N following the curvature of the track O, thereby causing said frame to move inwardly or outwardly, as the case may be, according to the position of the roller on the track. The knife P, being carried along by the frame M, cuts the material H, and as the outline of the templet K and the track O are the same, the rollers R of the block Q will be caused to bear against said templet, and as they follow the outline of the templet the knife will be caused to turn on its pivot $Q'$ and take such positions as will be necessary to present its cutting-edge foremost in all parts of its traverse and cut the material H in the desired outline. As the rollers R pass over the curve of the templet they will naturally cause the block Q to turn on its pivot, but as the knife P is at the pivotal center of the block the cutting-edge of the knife will be caused to cut the correct outline of the shoe-sole without diverging in any material degree. As soon as one sole is cut the cam J causes the presser to descend, and the aprons then feed the material forward sufficiently far for another sole, and so on continuously, the material being supplied to the aprons as needed. The relation of movement of the parts will be so adjusted as to give the desired motions and rotations to the different elements of the machine, but at the required times, so that each part will work conjointly in connection with the corresponding portions of the machine.

I claim as my invention—

1. The combination of a frame carrying rollers in pairs, and endless aprons passing over said pairs of rollers, a space being left between two of said aprons, and means for intermittently feeding said aprons, with clamps located between said aprons, and means for raising and lowering the latter to cause them to hold and liberate material conveyed by said aprons, substantially as herein specified.

2. The combination of a frame with a series of rollers arranged in pairs, and endless aprons passing over pairs of said rollers, one of said aprons being inclined downwardly and inwardly a ratchet and pawl mechanism connected with the roller of one apron, a crank shaft journaled in the frame and having a rod F extending to the crank-arm e, and a rod E connecting said crank-arm with the first-mentioned lever, and connections between said first-mentioned apron and the other aprons of the series for operating them simultaneously with a presser located between two of said aprons, and a cam for raising and lowering it, all arranged for joint operation substantially as set forth.

3. The combination of a movable presser with a templet located thereover, a rotary head having radially extending arms, a frame carried thereby adapted to be shifted radially outward and inward as it is carried around said templet by said head, a track corresponding in outline to said templet, but longer, a roller carried by said frame and adapted to travel on said track to cause the frame to follow the outline of the templet, a block swiveled on said frame and carrying a knife to cut the material held between the presser and templet, and rollers carried by said block to cause it to follow the outlines of the templet and be partially revolved to present the edge of the knife forward in all parts of its course, all combined and arranged for joint operation, substantially as herein specified.

4. The combination of a movable presser and a templet having a vertical stem with a head journaled to turn on said stem and having outwardly projecting parallel arms $L^4$, and with a frame M journaled on said arms, so as to slide thereon, said frame having an arm $M^2$ and roller N journaled thereon, a track O to receive said roller and corresponding in general outline to the shape of the templet, a block pivotally carried by said frame adapted to carry a knife, and two rollers carried by said block on opposite sides of said knife and adapted to engage said templet to cause the block to follow the outlines thereof, substantially as herein specified.

5. The combination of a movable presser and a templet with a knife carrying block and means for causing said block to travel around said templet, said block having a slot to receive a knife, a socket in said block, a spring located therein to bear against the knife, means for holding said spring, and a screw for holding said knife, substantially as described.

In testimony that I claim the invention above set forth I affix my signature in presence of two witnesses.

ALFRED N. MILLER.

Witnesses:
WILLIAM E. HAINES,
KIMBALL S. MILLER.